United States Patent [19]

Dorshimer

[11] Patent Number: 4,881,777

[45] Date of Patent: Nov. 21, 1989

[54] APPARATUS AND METHOD OF UTILIZATION THEREOF OF A PROFILE HEADREST

[75] Inventor: Glenn E. Dorshimer, Ann Arbor, Mich.

[73] Assignee: General Motors Corporation, Detroit, Mich.

[21] Appl. No.: 234,854

[22] Filed: Aug. 22, 1988

[51] Int. Cl.⁴ .............................................. A47C 7/38
[52] U.S. Cl. .................................... 297/406; 297/397; 297/408
[58] Field of Search .............. 297/406, 391, 397, 395, 297/403, 407, 410, 408; 280/751

[56] References Cited

U.S. PATENT DOCUMENTS

| 93,279 | 8/1869 | Cramer et al. | 297/406 |
| 322,843 | 7/1885 | Munagle | 297/395 |
| 361,528 | 4/1887 | Kazanjian | 297/408 X |
| 2,028,979 | 1/1936 | Hintz | 297/406 |
| 2,501,993 | 3/1950 | Conradt | 297/410 |
| 2,612,212 | 9/1952 | Lauterbach | 297/406 |
| 2,649,142 | 8/1953 | New | 297/395 |
| 2,833,554 | 5/1958 | Ricordi | 280/751 |
| 3,655,241 | 4/1972 | Herzer et al. | 297/408 |
| 4,647,066 | 3/1987 | Walton | 297/409 X |

FOREIGN PATENT DOCUMENTS 1531822 7/1967 France .................. 297/403

Primary Examiner—Peter R. Brown
Attorney, Agent, or Firm—Ernest E. Helms

[57] ABSTRACT

The present construction in a preferred embodiment provides an apparatus and method of utilization thereof of a vehicle seat headrest. The headrest includes a post for connecting the headrest with the vehicle seat in a generally vertical fashion, an upper head support adjustably horizontal pivotally connected to the post for supporting the head of an occupant of the seat, and a lower head support adjustably horizontal pivotally connected to the post independently of the upper head support for supporting the head of an occupant of the seat.

5 Claims, 2 Drawing Sheets

APPARATUS AND METHOD OF UTILIZATION THEREOF OF A PROFILE HEADREST

BACKGROUND OF THE INVENTION

The field of the invention is that of a vehicle seat headrest. More particularly, the field of the present invention is that of a vehicle seat headrest which is particularly adaptable for the rear row seating of a vehicle.

DISCLOSURE STATEMENT

It is known in the art to provide a vehicle seat with an adjustable headrest. A greater understanding of the adjustability of the vehicle seat headrests can be gained by a review of Mawbay et al "VEHICLE SEAT HEADREST APPARATUS AND METHOD" U.S. Pat. No. 4,720,146 commonly assigned.

Most headrests are adjustable in the manner of their angular tilt, or in their horizontal position. Often on long vehicular trips, a rear seat occupant may desire to utilize the headrest and not only tilt his head backwards but allow his head to turn to one of the other sides especially when attempting to sleep. This may be uncomfortable since the side of the cranium of the rear seat occupant will typically be unsupported. It is desirable to provide a vehicle seat headrest which supports the cranium of the vehicle seat occupant along a greater profile of the cranium of the vehicle seat occupant.

SUMMARY OF THE INVENTION

To meet the above noted and other desires the present invention is brought forth. The present invention in a preferred embodiment provides a vehicle seat headrest having a post which horizontally projects from the vehicle seat.

Horizontally projecting from and adjustably pivotably connected to the post are upper and lower head support arms. The upper and lower supports are also rotatable along their major axis. The above arrangement allows the headrest to assume a position of optimum comfort for the vehicle seat occupant supporting the side as well as the rear portions of the occupant's cranium. The rotation along the major axis allows the different portions of the supports to contact different vertical segments of the cranium. The vehicle seat occupant can now recline straight back or at an angle with the longitudinal axis of the vehicle and still be provided with a position of increased comfort.

It is an object of the present invention to provide an apparatus of a profile vehicle seat headrest and a method of utilization thereof.

It is an object of the present invention to provide a vehicle seat headrest for a seat occupant, the headrest including a post means for connecting the headrest with the vehicle seat in a generally vertical fashion, and an upper head support adjustably horizontally pivotally connected to the post means for supporting the head of an occupant of the seat, whereby the headrest can be adjusted to a profile of a seat occupant.

It is an object of the present invention to provide a vehicle seat headrest for a seat occupant, the headrest including a generally vertical post for connecting the headrest with the vehicle seat, an upper head support adjustably horizontally pivotally connected on the post for supporting the head of an occupant of the seat, the upper head support being rotatable along a generally horizontal axis, and a lower head support for supporting the head of an occupant of the seat projecting in a plane generally parallel with the upper head support being rotatable along a horizontal axis, whereby the headrest can be adjusted to a profile of a seat occupant.

It is an object of the present invention to provide a method of adjusting a vehicle seat headrest to match the profile of the head of a vehicle seat occupant, the method including connecting a generally vertical manner a post with the vehicle seat, pivoting a generally horizontal plane an upper head support being pivotally connected to the post in a horizontal plane, and pivoting in a horizontal plane a lower head support connected with the post pivotally projecting in a plane generally parallel to the upper head support, whereby the headrest is adjusted to a profile of a seat occupant.

Other objects and advantages of the present invention can become more apparent to those skilled in the art as the nature of the invention is better understood from the accompanying drawings and a detailed description.

DETAILED DESCRIPTION OF THE DRAWINGS

Figure 1:
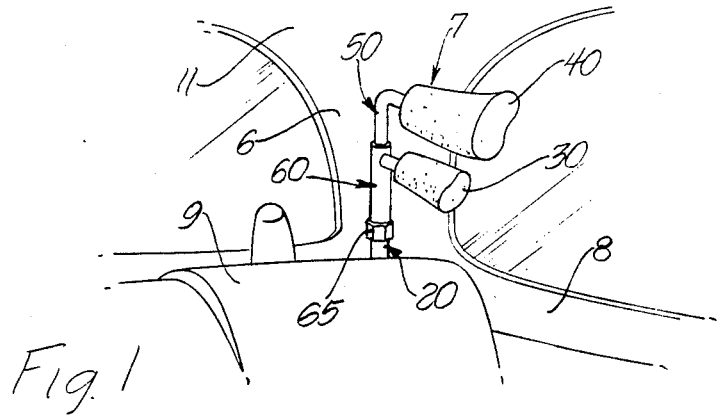
FIGS. 1 and 2 are perspective views of a preferred embodiment vehicle seat headrest of the present invention.
Figure 2:
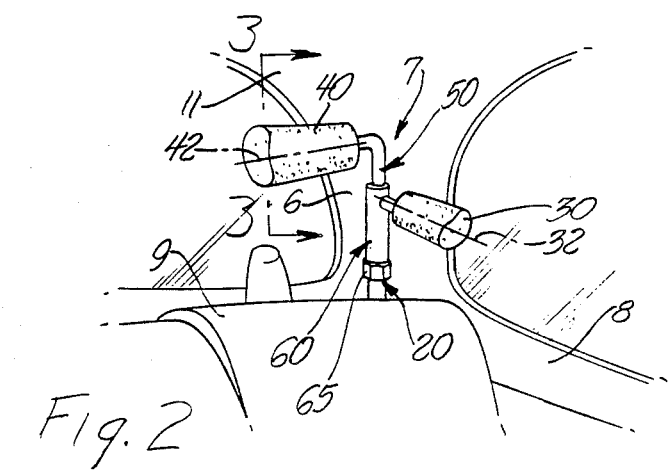

Referring to FIGS. 1–5, the vehicle seat headrest 7 of the present invention is shown in the environment of the rear row of an automotive vehicle 8. Connecting or mounting the headrest 7 with respect to a vehicle seat 9 in a generally vertical fashion is the post means 20. The post means 20 can be a generally vertical post 20 connected with the vehicle seat 9 or in an alternative embodiment can be the rear pillar 6 of the vehicle roof 11.

Figure 3:
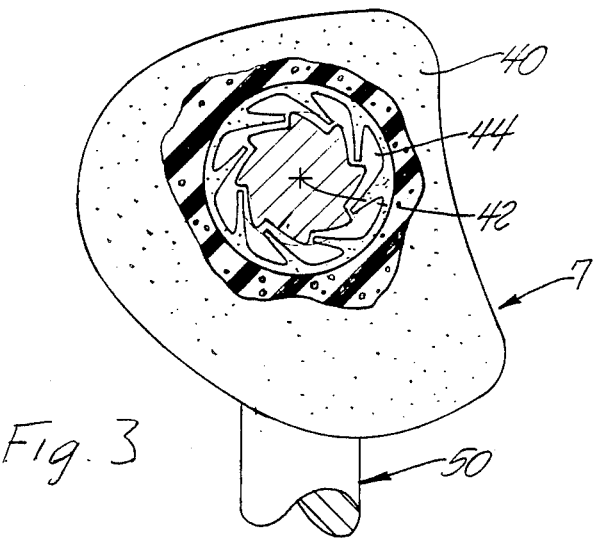
FIG. 3 is a view taken along line 3—3 of FIG. 2.

Pivotally connected to the post 20 and projecting therefrom in a parallel fashion is an upper head support 40 and a vertically spaced apart lower head support 30. Both the upper head support 40 and the lower head support 30 are adjustable in the horizontal plane preferably within a range of 90 degrees or more. The lower 30 and upper 40 head supports also can rotate along their major horizontal 32, 42 axis. As best shown in FIG. 3, the upper head support 40 is free to rotate 360 degrees and has a ratchet mechanism 44 allowing the rotated position of the head support 40 to be maintained.

Figures 4, 5:
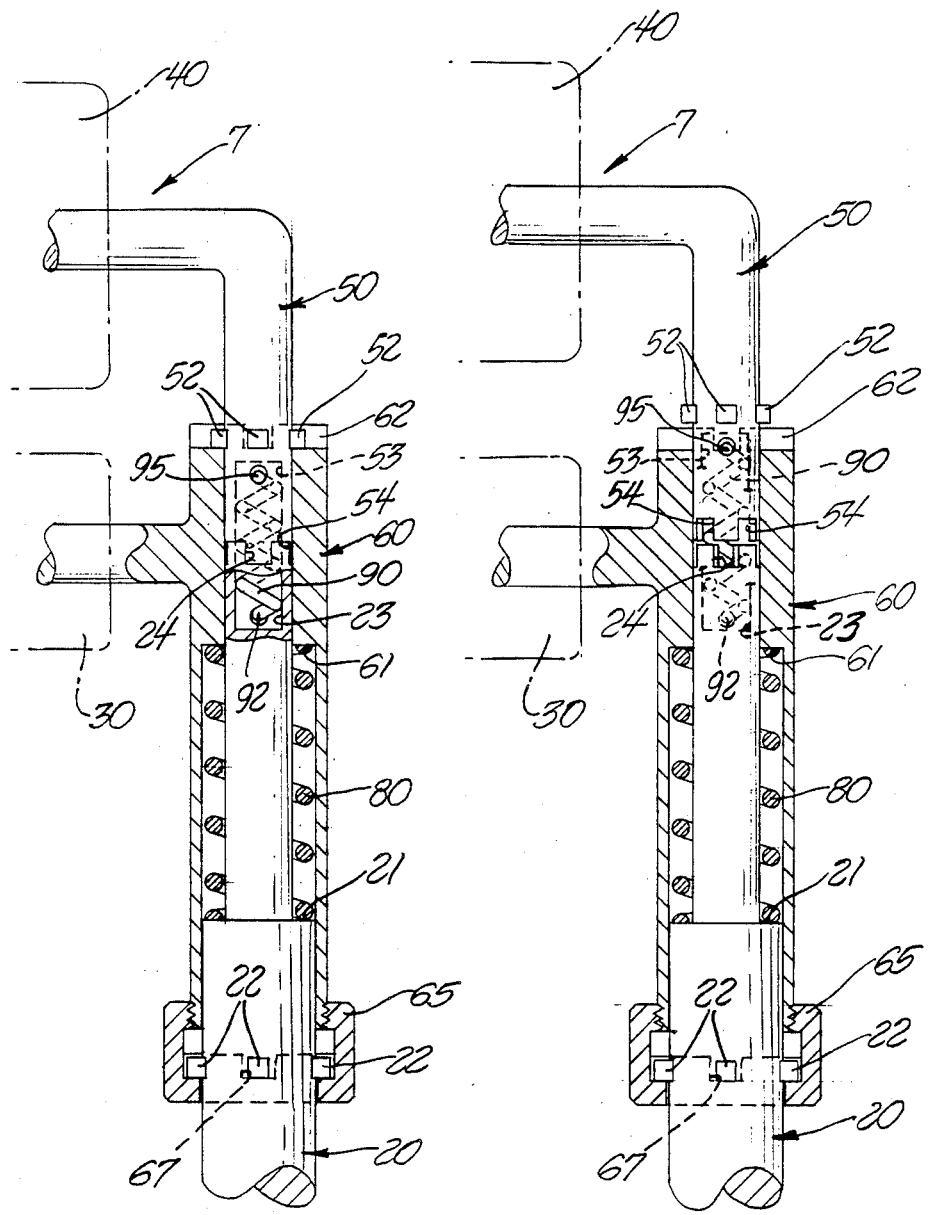
FIGS. 4 and 5 are sectional cut-away views of the headrest shown in FIG. 1.

FIGS. 4 and 5 illustrates in further detail the arrangement which allows autonomous adjustment in the horizontal plane of the upper 40 and lower 30 head supports independent of one another.

The post 20 has a lower flange or group of studs 22. At an upper end the post has a series of slots 24. Meshed into the slots 24 of the post 20 by a series of aligned slots 54 is an upper post extension 50. The upper post extension 50 extends upward and rotatably mounts the upper head support 40 as previously described. The upper post extension 50 also has a series of studs 52 projecting radially outward. Surrounding the post 20 and upper post extension 50 is an outer post sleeve 60 which is connected with the lower head support 30. The outer post sleeve 60 has a top portion with a notched 62 end which meshes with the stud 52 of the upper post extension 50. The outer post sleeve 60 also has threadably joined thereto a collar 65 which has a series of slots 67 which mesh with the studs 22.

A coil spring 80 in compression encircles the post 20 and is captured between a step 21 of post 20 and a step 61 of outer post sleeve 60. The post 20 has a tubular section 23 adjacent to a tubular section 53 of the upper post extension 50. Within tubular sections 23 and 53 is a spring 90 with tabbed ends 95 and 92 extending through apertures in the upper post extension 50 and post 20 respectively.

To adjust the position of the lower head support 30, the lower post sleeve 60 (via the lower head support 30) is first pulled downward removing it from interference with the studs 52 of the upper post extension against the action of the spring 80. At the same time slot 67 of the collar 65 will be clear of studs 22 of the post 20. The lower support is then pivotally adjusted to the desired position and then is released. Thereafter slots 67, 62 will reengage with studs 22, 52 locking the lower head support 30 in the newly adjusted position.

To adjust the upper head support, the upper head support 40 is pulled upward separating the upper post extension 50 from the post 20 against the action of the spring 90. The lower post sleeve 60 will be prevented following the upper post by virtue of the collar's 65 slot 67 engagement with the studs 22. After the studs 52 and slots 54 move axially past slots 62 and 24, the upper head support 40 can be pivotally adjusted as desired.

The aforedescribed arrangements allow incremental positioning of the upper 40 and lower 30 head supports, however, it in an alternative embodiment frictional engagement could be relied upon studs 22 and slots 67 could be eliminated.

The present invention provides a method of adjusting a vehicle seat headrest 7 to match the profile of the head of a vehicle seat occupant, the method in combination comprising:

1. Connecting in a generally vertical manner a post 20 with the vehicle seat 9;
2. Pivoting in a generally horizontal plane an upper head support 40 being pivotally connected to the post 20 in a horizontal plane; and
3. Pivoting in a horizontal plane a lower head support 30 connected with the post 20 pivotally projecting in a plane generally parallel to the upper head support 40, whereby the headrest 7 is adjusted to a profile of a seat occupant.

While an embodiment of the present invention has been explained, it will be readily apparent to those skilled in the art of the various modifications which can be made to the present invention without departing from the spirit and scope of this application as it is encompassed by the following claims.

The embodiments of the invention in which an exclusive property or privilege is claimed are defined as follows:

1. A vehicle seat headrest for a seat occupant of a vehicle seat, said headrest in combination comprising:
    a post means comprised of at least two independent colinear members for mounting said headrest with respect to said vehicle seat in a generally upward extending vertical fashion;
    an upper head support adjustably horizontally pivotally connected to said post means for supporting the head of an occupant of said seat, whereby said headrest can be adjusted to a profile of a seat occupant; and
    a lower head support connected with said post means and generally parallel with and vertically spaced from said upper head support and said lower head support is autonomously adjustably horizontally pivotally connected to said post means independent of said upper head support.

2. A vehicle seat headrest for a seat occupant of a vehicle seat, said headrest in combination comprising:
    a generally vertical post for connecting said headrest with said vehicle seat;
    an upper head support adjustably horizontally pivotally connected on said post for supporting the head of an occupant of said seat, said upper head support being rotatable along a generally horizontal axis; and
    a lower head support for supporting the head of an occupant of said seat connected with said post and projecting in a plane generally parallel with said upper head support being rotatable along a horizontal axis, whereby said headrest can be adjusted to a profile of a seat occupant.

3. A method of adjusting a headrest of a vehicle seat to match the profile of the head of a vehicle seat occupant, said method in combination comprising:
    mounting a post comprised of at least two independent colinear members in a generally vertical manner with respect to said vehicle seat;
    pivoting in a generally horizontal plane an upper head support being pivotally connected to said post in a horizontal plane; and
    autonomously pivoting in a horizontal plane a lower head support being independent from said upper head support and being connected with said post pivotally projecting in a plane generally parallel to said upper head support and vertically spaced from said upper head support whereby said headrest is adjusted to a profile of a seat occupant.

4. A vehicle seat headrest for a seat occupant of a vehicle seat, said headrest in combination comprising:
    a post means for connecting said headrest with said vehicle seat in a generally vertical fashion;
    an upper head support adjustably horizontal pivotally connected to said post means for supporting the head of an occupant of said seat, whereby said headrest can be adjusted to a profile of a seat occupant; and
    a lower head support connected with said post means and generally parallel with and vertically spaced from said upper head support and wherein said lower head support rotates on a generally horizontal axis.

5. A vehicle seat headrest for a seat occupant of a vehicle seat, said headrest in combination comprising:
    a general vertical post for connecting said headrest with said vehicle seat;
    an upper head support adjustably horizontally pivotally connected on said post for supporting the head of an occupant of said seat, said upper head support being rotatable along a generally horizontal axis; and
    a lower head support for supporting the head of an occupant of said seat connected with said post and projecting in a plane generally parallel with said upper head support being rotatable along a horizontal axis, whereby said headrest can be adjusted to a profile of a seat occupant and wherein said a lower head support can be autonomously adjustably pivoted on said post independently of said upper head support.

* * * * *